United States Patent
Dull et al.

(10) Patent No.: US 9,914,244 B2
(45) Date of Patent: Mar. 13, 2018

(54) BLADDER SYSTEM FOR CURING COMPOSITE PARTS

(71) Applicant: The Boeing Company, Chicago, IL (US)

(72) Inventors: Kenneth M. Dull, Puyallup, WA (US); Gordon M. Cox, Issaquah, WA (US); Darrell D. Jones, Seattle, WA (US); Douglas A. McCarville, Tukwila, WA (US); Michael K. Louie, Renton, WA (US); Robert L. Anderson, Tukwila, WA (US)

(73) Assignee: The Boeing Company, Chicago, IL (US)

( * ) Notice: Subject to any disclaimer, the term of this patent is extended or adjusted under 35 U.S.C. 154(b) by 531 days.

(21) Appl. No.: 14/450,947

(22) Filed: Aug. 4, 2014

(65) Prior Publication Data

US 2016/0031167 A1    Feb. 4, 2016

(51) Int. Cl.
| | |
|---|---|
| *B29C 33/50* | (2006.01) |
| *B29C 70/44* | (2006.01) |
| *B29C 43/00* | (2006.01) |
| *B29L 31/00* | (2006.01) |
| *B29C 43/36* | (2006.01) |

(52) U.S. Cl.
CPC .......... *B29C 33/505* (2013.01); *B29C 43/003* (2013.01); *B29C 70/446* (2013.01); *B29C 43/3642* (2013.01); *B29L 2031/003* (2013.01)

(58) Field of Classification Search
CPC ..... B29C 33/505; B29C 70/44; B29C 70/446; B29C 43/12; B29C 43/3642; B32B 37/10; B29L 2031/003
See application file for complete search history.

(56) References Cited

U.S. PATENT DOCUMENTS

| 5,037,599 A | * | 8/1991 | Olson | ..................... B29C 70/44 264/136 |
|---|---|---|---|---|
| 5,116,216 A | * | 5/1992 | Cochran | ................. B29C 70/44 156/286 |
| 5,366,684 A | | 11/1994 | Corneau, Jr. | |

(Continued)

FOREIGN PATENT DOCUMENTS

| DE | 102010024120 A1 | 12/2011 |
|---|---|---|
| EP | 2671709 A1 | 12/2013 |

(Continued)

OTHER PUBLICATIONS

Extended European Search Report issued in European Patent Application No. 151731173.4 dated Dec. 11, 2015.

*Primary Examiner* — Christopher T Schatz (74) *Attorney, Agent, or Firm* — McDonnell Boehnen Hulbert & Berghoff LLP (57) ABSTRACT

Method and apparatus for use in curing of a composite charge having an internal cavity. Apparatus includes a flexible bladder adapted to be placed in the cavity for applying pressure on the composite charge during curing. An end fitting is operatively coupled to the flexible bladder. The end fitting defining a bolt bore and a horizontal bore. When a vent bolt is operatively coupled to the bolt bore of the end fitting, the vent bolt and the horizontal bore define a pressure passageway that allows an interior of the bladder to become subjected to external pressure.

13 Claims, 7 Drawing Sheets

(56) References Cited

U.S. PATENT DOCUMENTS

| | | | |
|---|---|---|---|
| 5,386,807 A | 2/1995 | Linder | |
| 6,685,232 B2 | 2/2004 | Sampson | |
| 8,074,694 B2 | 12/2011 | Brook et al. | |
| 8,430,984 B2 | 4/2013 | Lee et al. | |
| 8,556,618 B2 | 10/2013 | Bergmann | |
| 2010/0006739 A1 | 1/2010 | Robins et al. | |
| 2010/0009124 A1 | 1/2010 | Robins et al. | |
| 2010/0139850 A1 | 6/2010 | Morris et al. | |
| 2012/0181787 A1 | 6/2012 | Mitchell | |
| 2012/0235336 A1* | 9/2012 | Sana | B29C 33/505 269/47 |
| 2013/0139945 A1* | 6/2013 | Buerkner | B29C 33/505 156/60 |
| 2013/0327477 A1 | 12/2013 | Hollensteiner et al. | |
| 2015/0283765 A1 | 10/2015 | Buerkner et al. | |

FOREIGN PATENT DOCUMENTS

| | | |
|---|---|---|
| WO | 2008015115 A1 | 2/2008 |
| WO | 2009020466 A1 | 2/2009 |

* cited by examiner

BLADDER SYSTEM FOR CURING COMPOSITE PARTS

FIELD

The present disclosure generally relates to methods and equipment for fabricating composite resin parts, and deals more particularly with a bladder system used in curing composite parts.

BACKGROUND

Composite resin parts may be cured within an autoclave that applies heat and pressure to the part during a cure cycle. Some part geometries include internal cavities that may cause the part to collapse under autoclave pressure unless a tool such as an inflatable bladder is placed in the cavity. Such an inflatable bladder may be inflated during a cure process so as to react the autoclave pressure force applied to the part. Typically, these inflatable bladders are pressurized by venting them to the autoclave pressure through a vacuum bag.

There are several problems with the vented bladders described above that may lead to inconsistencies in the cured parts. For example, failure to properly vent the bladder may prevent the bladder from becoming pressurized sufficiently to react the applied autoclave pressures. Similarly, insufficient bladder pressurization may result from the failure of sealant used to seal a vent hole coupling the bladder with an outside vent. It is also possible for a bladder wall to fail or be penetrated, in which event autoclave gases may be forced into the part throughout the cure cycle. Accordingly, there is a need for a bladder system that may reduce or eliminate the adverse effects resulting from leaks in the bladder or failure to properly pressurize the bladder. There is also a need for a bladder system and curing method that utilizes venting the bladder system to an external pressure, such as an autoclave pressure, while at the same time also eliminating the need for vacuum bag vent hole seals.

SUMMARY

Method and apparatus for use in curing of a composite charge having an internal cavity is presented. Exemplary apparatus includes a flexible bladder adapted to be placed in the cavity for applying pressure on the composite charge during autoclave curing. An end fitting is operatively coupled to the flexible bladder. The end fitting defining a bolt bore and a horizontal bore. When a vent bolt is operatively coupled to the bolt bore of the end fitting, the vent bolt and the horizontal bore define a pressure passageway that allows an interior of the bladder to become subjected to an external pressure, such as an autoclave pressure.

The apparatus may also comprise a flexible bag that is sealed over the flexible bladder, the bladder end fitting, and the vent bolt. The apparatus may also include a cure tool that is adapted to have the composite charge placed thereon, wherein the flexible bladder is located on the cure tool and the flexible bag is sealed to the cure tool. The cure tool may comprise a metallic or a composite cure tool. Furthermore, the bolt bore of the bladder end fitting may be positioned to align with a tool bore provided along a matching surface of the cure tool. In one arrangement, when the vent bolt is inserted into the bolt bore of the bladder end fitting, and the vent bolt may be torqued into place such that that the vent bolt threadingly connects to the tool bore. Alternatively, the vent bolt may threadingly connect to a threaded insert provided in the tool bore.

In one alternative arrangement, the bolt bore of the bladder end fitting extends from a first surface to a second surface of the bladder end fitting.

In another arrangement, the tool comprises a vacuum port adapted to be coupled with a vacuum source for selectively relieving pressure within the flexible bag.

In yet another arrangement, the bolt bore of the bladder end fitting comprises a first bolt bore section and a second bolt bore section wherein a diameter of the first bolt bore section is different than a diameter of the second bolt bore section. The diameter of the first bolt bore section may be larger than the diameter of the second bolt bore section.

In another arrangement, an internal bolt bore of the vent bolt and the horizontal bore of the end fitting define the pressure passageway that allows an interior of the bladder to become subjected to an external pressure, such as an autoclave pressure.

In another arrangement, a method is of autoclave curing a composite part charge having an internal cavity is disclosed comprising the steps of supporting the composite part charge within the autoclave; installing a bladder in the composite part charge; coupling the bladder to a bladder end fitting; utilizing a vent bolt to secure the bladder end fitting to a cure tool, wherein the vent bolt and bladder end fitting define a pressure passageway to provide an external pressure to an interior of the bladder. In one arrangement, this method may also include the step of pressurizing the bladder by subjecting the interior of the bladder to an external pressure by way of the pressure passageway defined by the vent bolt and the bladder end fitting. Additionally, the method may also include the steps of sealing a flexible bag over the flexible bladder, the bladder end fitting, and the vent bolt.

In another arrangement, the method may further comprise the step of adapting a cure tool to have the composite charge placed thereon, and wherein the flexible bladder is located within a cavity of the composite charge.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIGS. 6 C-D illustrate pressure sealing members that may be used with the bladder end fitting illustrated in FIG. 5;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The present disclosure provides for embodiments of a bladder system having at least one end fitting. Embodiments of the structure and method may be used in aircraft, spacecraft, motor craft, watercraft, and other craft, as well vehicles and other similar structures. In addition, embodiments of the structure and method may be used with integrated commercial building materials for both cooling applications, as well as energy harvesting from lightweight structures.

Figure 1:
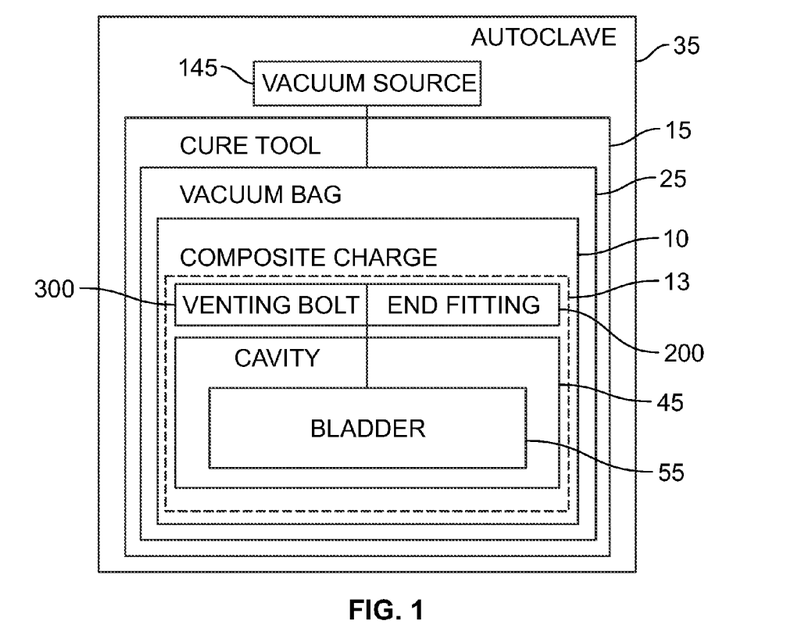
FIG. 1 is an illustration of a functional block diagram of a bladder system according to the disclosed embodiments.

Referring first to FIG. 1, an uncured composite resin part 10, may be hereafter referred to as a "charge", a "composite charge", a "composite part charge" or a "stringer charge." Such a charge may be supported within the autoclave. Specifically, the charge 10 may be cured on a cure tool 15 placed in an autoclave 35 in which autoclave heat and pressure are applied to the composite charge 10. The composite charge 10 includes one or more internal voids, trapped or enclosed areas, or cavities, which for ease of description, will collectively be referred hereinafter as a charge cavity 13.

A bladder system comprising a flexible, inflatable bladder 55 that is operably coupled to a bladder end fitting 200 is also provided. As just one example, the flexible, inflatable bladder 55 may be sealed onto a portion of the bladder end fitting 200. The flexible, inflatable bladder 55 may be placed within or may be inserted into the internal cavity 45 of the cure tool 15 prior to a cure cycle in order to react external pressures applied to the charge 10 during a curing process, such as during an autoclave curing process. The bladder end fitting 200, in this arrangement may be bonded or sealed to the flexible, inflatable bladder 55. In one preferred arrangement, and as will be explained in greater detail below, the bladder end fitting 200 may comprise a metallic (e.g., Aluminum) or composite material having a substantially, rectangular configuration comprising a generally, planar top surface and a generally planar, bottom surface. Preferably, the bladder end fitting defines a bolt bore that extends from a first surface to a second surface of the end fitting. This bolt bore may be configured to receive a venting bolt 300. Such a venting bolt 300 may comprise an internally relieved bolt, also referred to in the art as a banjo bolt. Preferably, the bladder end fitting 200 also defines a horizontal bore that extends along a second portion of the end fitting. It is this second portion of the end fitting that will reside inside the inflatable bladder 55.

The bladder end fitting 200 in combination with the venting bolt 300 are configured, such that, when the venting bolt 300 is operably coupled to the bolt bore of the bladder end fitting, an internal bore of the venting bolt 300 and the horizontal bore of the end fitting work together so as to define an internal passageway that allows an external pressure to be applied to an interior of the bladder. As such, the external pressure residing outside a vacuum bagged cure tool is allowed to enter from a bottom side of the tool, through a bore of the venting bolt, through the bladder end fitting and then into the bladder 55. As such, the disclosed bladder system provides autoclave venting to the flexible, inflatable bladder 55 without having to provide any type of venting ports in a vacuum bag 25. As such, the bladder end fitting 200, the venting bolt 300, and the inflatable bladder 55 work together so as to form a closed system such that an interior of the bladder 55 may be directly exposed to the internal atmosphere of the autoclave 35.

A flexible bag, such as a vacuum bag 25, may be placed over and sealed over the flexible bladder 55, the bladder end fitting 200, the vent bolt and then secured to the cure tool 15. As such, the vacuum bag 25 would provide vacuum covering to the composite charge 10, the inflatable bladder 55, the bladder end fitting 200, and a top portion of the venting bolt 300. Importantly, in this bladder system configuration, no venting holes are required within the vacuum bag 25 so as to provide external pressure inside the flexible bladder 55. The flexible bag 25 is adapted to be coupled with a suitable vacuum source 145 for evacuating the flexible bag 25.

Figure 2:
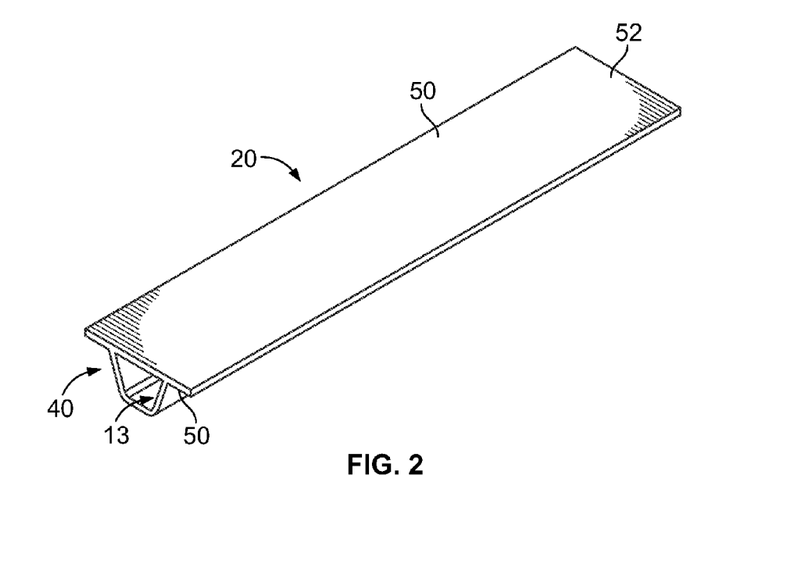
FIG. 2 is an illustration of a perspective view of a composite resin stringer cured using the bladder system shown in FIG. 1.

Referring now to FIG. 2, the disclosed bladder system and curing method may be employed to cure a variety of composite resin parts of various geometries, having one or more internal cavities. For example, and without limitation, the disclosed bladder system and method may be used in the fabrication of a fiber reinforced composite resin stringer 20. In one preferred arrangement, this stringer 20 may comprise a multi-ply layup of prepreg. In this illustrated arrangement, the stringer 20 comprises a hat section 40 forming an internal stringer cavity 45, a pair of laterally extending flange sections 50, and a substantially flat skin section 52 that is consolidated together with the flange sections 50 during curing. As those of ordinary skill in the art will recognize, alternative stringer geometries are possible.

Figure 3:
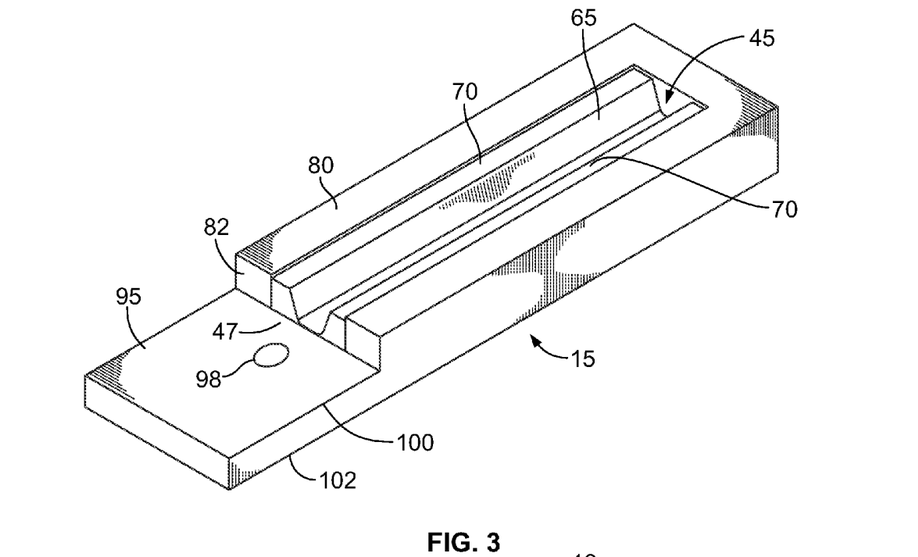
FIG. 3 is an illustration of a perspective view of a cure tool used in curing a composite stringer charge.

FIGS. 3-11 respectively illustrate successive stages in the preparation of the apparatus shown in FIG. 1 for curing of the stringer 20 shown in FIG. 2. Referring particularly to FIG. 3, a cure tool 15 comprises any suitable material. For example, for certain applications, a suitable cure tool material may comprise a nickel-iron alloy such as Invar. Alternatively, the cure tool may comprise composite material. Where the cure tool comprises a composite tool, a threaded insert may be used to threadedly affix the venting bolt to the cure tool.

In this illustrated arrangement, the cure tool 15 defines at least one charge cavity 45 and this charge cavity may define a hat section tool face 65, along with a pair of laterally extending, flange section tool faces 70. In one preferred arrangement, the tool faces 65, 70 are configured to respectively match the geometry of the hat section and flange sections 40, 50 respectively of the stringer 20 illustrated in FIG. 2. The cure tool 15 further comprises a substantially flat upper tool surface 80 surrounding the internal cavity 45. The tool further defines a wall structure 82 at one end of the cavity 45, and a substantially flat end section 95 extending from the wall structure 82. The substantially flat end section 95 defines a tool bore 98. In one preferred arrangement, this tool bore 98 extends from a top surface 100 of the end section 95 to a bottom surface 102 of the end section 95. In one preferred arrangement, this tool bore 98 may be configured to receive a vent bolt, such as the vent bolt 300 discussed with respect to FIG. 1. In addition, and as illustrated, a first end of the internal cavity 45 is open at 47 and this open end resides generally adjacent the location of the tool bore 98.

As will be discussed below, the cure tool 15 may be used to assemble composite stringer charges, and to cure the assembled charges within an autoclave 35, as generally discussed with referenced to FIG. 1. While the illustrated cure tool 15 comprises a geometry that is adapted to match features of the stringer 20, as those of ordinary skill in the art will recognize, the cure tool 15 and the bladder system 60 comprising the inflatable bladder 55, the bladder end fitting 300, and the vent bolt 200 may be used with cure tools having any of various other geometries, depending on the application and the particular composite part charge to be cured. As just one example, such a cure tool and bladder system may be used to in a system for the simultaneous co-curing a plurality of stringers along a mandrel.

Figure 4:
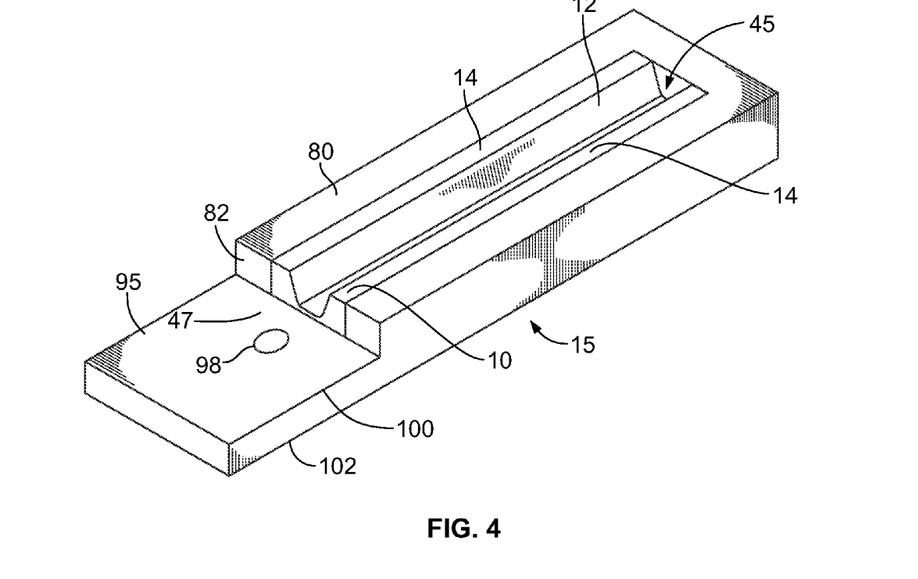
FIG. 4 is an illustration similar to FIG. 3 but showing a stringer charge having been placed on the tool.

Referring now to FIG. 4, a composite stringer charge 10 may be supported within an autoclave by being layed up or placed on the cure tool 15. In this illustrated arrangement, the stringer charge 10 comprises a hat 12 filling the cavity 45 and engaging the tool face 65 (FIG. 3), and a pair of laterally extending flanges 14 respectively engaging the tool faces 65. In one preferred arrangement, the stringer charge 10 may be laid up on a separate layup tool (not shown) and then transferred to the cure tool 15. In an alternative preferred arrangement, depending on the geometry and/or complexity of the part charge 10, it may be possible to layup the stringer directly on the cure tool 15.

After the stringer charge 10 has been placed in the cure tool 15, a bladder system 60 comprising a flexible bladder 55, a bladder end fitting 200, and a vent bolt may be operably coupled to the cure tool 15. In one preferred arrangement, and as will be described in greater detail herein, the flexible bladder 55 may be inserted into the cavity 45 of the tool with the bladder end fitting 200 positioned over the tool bore 98 and with the bladder end fitting 200 inserted into the open end 47 of the cavity 45. In this position, the end fitting 200 would reside partially within the flexible bladder 55.

Figure 5:
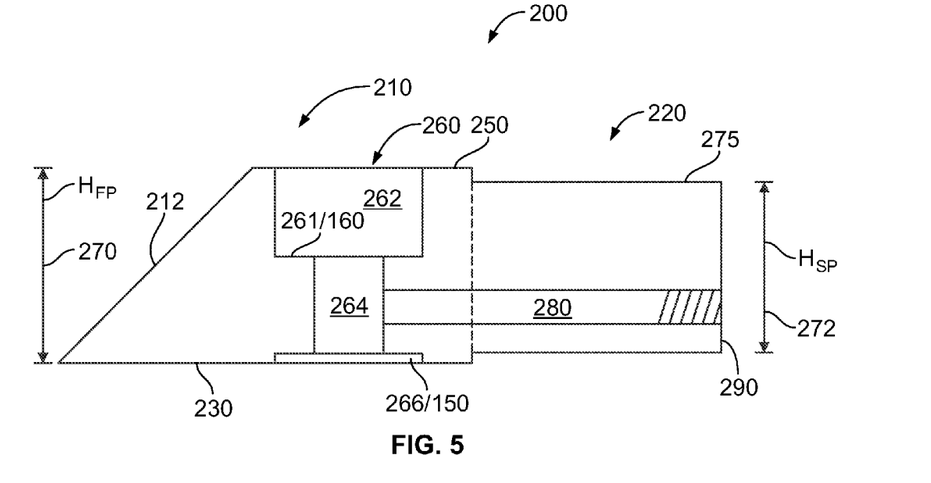
FIG. 5 is an illustration of a bladder end fitting that may be used with the tool illustrated in FIG. 4.
Figure 7:
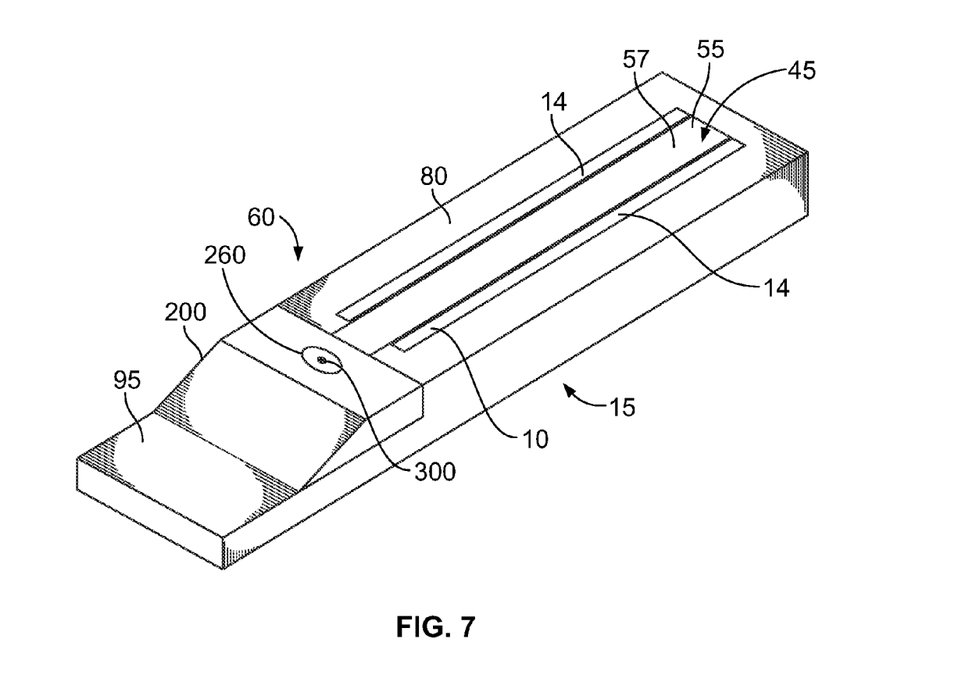
FIG. 7 is an illustration similar to FIG. 4 but showing a bladder system comprising a bladder end fitting (FIG. 5), a venting bolt (FIGS. 6A and B), and an inflatable bladder wherein the inflatable bladder has been placed within the cavity of the stringer charge.

For example, FIG. 5 illustrates one arrangement of a bladder end fitting 200 that may be used with the bladder system 60 (see, e.g., FIG. 7). As illustrated, in one preferred arrangement, the bladder end fitting 200 comprises a first chamfered surface portion 210 and a second rectangular portion 220. The first portion 210 may comprise a chamfered surface 212 that extends from a first or bottom surface 230 of the end fitting towards a second or top surface 250 of the end fitting. Furthermore, this first portion 210 defines a bolt bore 260 that extends between the first and second surfaces 230, 250. In this illustrated arrangement, the bolt bore 260 comprises a first bore section 262 near the upper surface 250 and a second bore section 264 that resides beneath the first bore section 262. As illustrated, a diameter of the first bolt bore section is different than a diameter of the second bolt bore section. Specifically, the diameter of the first bolt bore section is larger than the diameter of the second bolt bore section. One advantage of such a bolt bore configuration is that it allows for the use of a vent bolt such as an internally relieved bolt such as a banjo fitting or bolt. One advantage of using such a bolt with the presently disclosed bladder system is their ability to withstand high pressure applications, such as those high pressures normally experienced during when the composite charge is supported within the autoclave during a curing step.

Additionally, a spotface or machined feature 266 providing a smooth, and flat surface may also be provided along the bottom surface 230 of the bolt bore 260. This machined feature 266 may be configured to receive a first pressure sealing member (for example, first sealing member 150 FIG. 6C) when the end fitting 200 is mounted to a cure tool, such as when the end fitting 200 is mounted to the substantially flat surface section 95 of cure tool 15 of FIGS. 3-4. In a similar manner, a bottom surface 261 of the first bore section 262 may also be configured to receive a second pressure sealing member 160 (for example, sealing member 160 FIG. 6D).

Figure 6A:
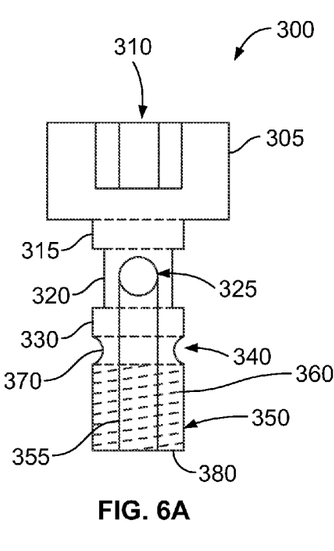
FIGS. 6A and B illustrate a venting bolt that may be used with the bladder end fitting illustrated in FIG. 5.
Figure 6B:
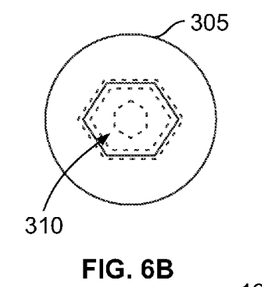
Figure 6C:
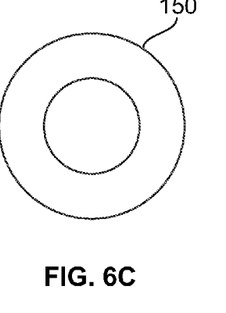
Figure 6D:
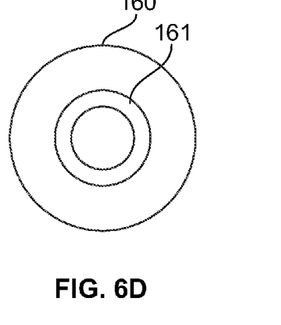

For example, FIG. 6C illustrates a first pressure sealing member 150 and FIG. 6D illustrates a second sealing member 160. In one preferred arrangement, such a pressure sealing member 150 may take the form of an elastomeric sealing ring or compressible o-ring. In another preferred arrangement, the pressure sealing member 150 may take the form of a metal washer with an o-ring contained on the inside, as a gasket such as the Duo-Seal gaskets provided by Rubbercraft of Long Beach, Calif. When installed, such pressure sealing members may be compressed between the venting bolt 300 and the end fitting 200 and the end fitting and the flat section 95 of the tool 15 so as to seal and therefore properly contain the external pressure within the pressure passageway 390 (see, e.g., FIG. 11).

In one preferred arrangement, the first pressure sealing member 160 provided into the machined feature 261 comprises a metal washer with an o-ring contained on an inner circumference 161 of the metal washer, as illustrated in FIG. 6D. In one preferred arrangement, the second pressure sealing member provided at the bottom surface 261 of the first bore section 262 comprises an elastomeric sealing ring. Alternative pressure sealing member configurations may also be used.

The bladder end fitting 200 further defines a horizontal bore 280. As illustrated, the horizontal bore 280 extends horizontally along the second portion 220 of the end fitting 200 from the second bore section 264 towards a wall section 290 of the second portion 220. As such, the bolt bore 264 (i.e., the second bore section) and the horizontal bore 280 reside in fluid communication with one another. As also illustrated, the second end 220 of the end fitting 200 comprises a generally rectangular shape whose overall height $H_{SP}$ 272 is slightly smaller than the overall height $H_{FP}$ 270 of the first end of the end fitting. One reason for the smaller height of the second portion 220 is to allow for an interior of the bladder to be operatively coupled or attached to an outer surface 275 this rectangular end 220. As those of ordinary skill in the art will recognize, different height $H_{SP}$ 272, $H_{FP}$ 270 configurations may also be used. For example, in one alternative arrangement, height $H_{SP}$ 272 may be equal to or greater than height $H_{FP}$ 270.

FIG. 6A illustrates a perspective view of a vent bolt 300 that may be used with the end fitting 200 illustrated in FIG. 5. FIG. 6B illustrates a top view of the vent bolt 300 illustrated in FIG. 6A. In one preferred arrangement, this vent bolt comprises a banjo bolt.

Referring now to FIGS. 6A and 6B, the vent bolt 300 comprises an enlarged vent bolt head 305 defining an enlarged head opening 310. As may be seen from FIG. 6B, the enlarged head opening 310 may comprise a hexagonal shaped opening so as to allow a similarly shaped driving tool to drive and/or screw the vent bolt into place on the top surface of the cure tool when the vent bolt is placed into the bore of the bladder end fitting 200 so as to not protrude above the top surface 250 of the end fitting 200 (see, e.g., FIG. 5).

The vent bolt 300 further comprises a bolt shaft 340 that extends away from the enlarged head 305. Importantly, this bolt shaft 340 defines an internal bolt bore 355 that extends at least along a portion of the bolt shaft 340. The shaft 340 further comprises a first neck portion 315 extending immediately from the enlarged head 305. A second neck portion 320 extends from the first neck portion 315 and a third neck portion 330 extends from this second neck portion 220. The third neck portion 330 resides adjacent an annular groove 370. The bolt shaft 340 further comprises a connection end 350 that comprises a thread 360. In this arrangement, the thread 360 comprises an external thread. Importantly, in this illustrated arrangement, the internal bore 355 of the shaft 340 extends from a bottom bolt surface 380 of the bolt shaft 340 to the second neck portion 320. The vent bolt further comprises an axially vent port 325. This vent port 325 is also provided on the second neck portion 320 and is in fluid alignment with the internal bolt bore 355.

In a next process step, as illustrated in FIG. 7, the bladder system 60 is installed onto the cure tool 15. Specifically, the inflatable bladder 55 of the bladder system 60 is placed within the internal cavity 45 of the stringer charge 10 in order to react external pressures that are applied during a curing cycle. The bladder 55 may be formed of any suitable material such, for example and without limitation, an elastomer. A release agent or a release film may be applied to the bladder 55 before it is installed to facilitate later removal of the bladder from the cavity 45 following curing. In one preferred arrangement, the bladder 55 is adapted to be coupled with the second portion 220 (i.e., the rectangular portion) of the bladder end fitting 200 shown in FIG. 5. In this example, the bladder 55 is configured to substantially match the geometry of the internal cavity 45 and has a substantially flat upper surface 57 that resides substantially flush with the flat tool surfaces 80 of the cure tool 15.

As also illustrated in FIG. 7, as the bladder end fitting 200 has been placed along the end section 95 of the tool 15. In this installed position, the bolt bore 260 of the bladder end fitting 200 is positioned so as to align with the bolt bore 98 provided along the upper surface of the cure tool 15. In addition, the bladder 55 may be permanently attached and sealed to the bladder end fitting 200, thereby obviating the need to reconnect the bladder 55 to bladder end unit 200 each time the bladder 55 is installed in a composite charge 10 in preparation for a curing process.

Next, a vent bolt 300 may be operably inserted into the bolt bore 260 of the bladder end fitting 200. As this vent bolt is inserted into the bolt bore 260, it may further be torqued into place such that it threadedly connects the connection end 350 of the vent bolt 300 to the bolt bore 98 of the tool 15 (see, e.g., FIG. 4). When properly inserted, the vent bolt 300 is positioned within the bladder end fitting 200 such that the vent port 325 of the vent bolt 300 aligns with the horizontal bore 280 of the bladder end fitting. Torqueing the vent bolt 300 in place compresses the first pressure sealing member between the venting bolt 300 and the end fitting 200 and second pressure sealing member between the end fitting and the flat section 95 of the tool 15 so as to seal and therefore properly contain the external pressure within the pressure passageway 390 (see, e.g., FIG. 11).

Figure 8:
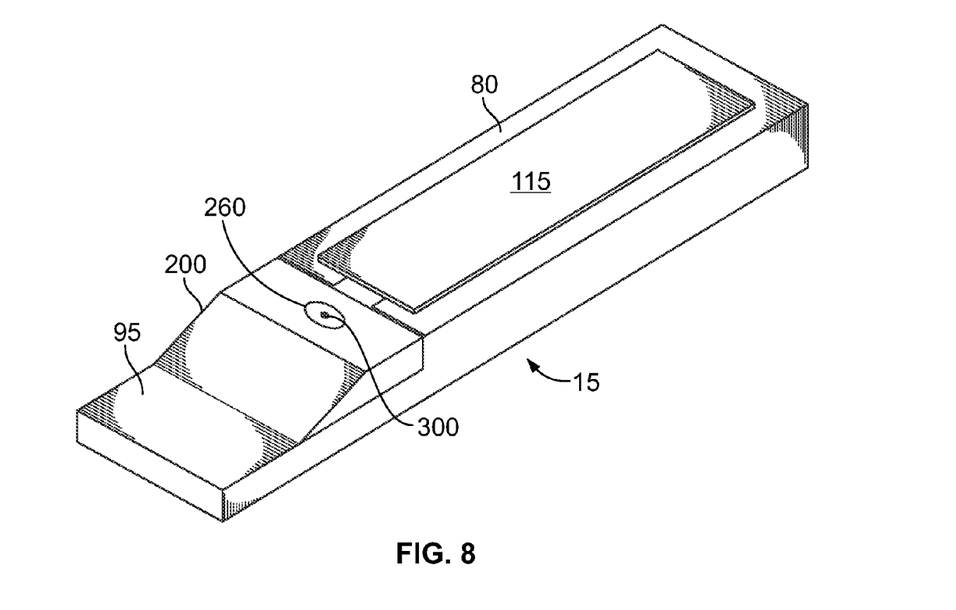
FIG. 8 is an illustration similar to FIG. 7 but additionally showing a skin charge having been placed on the stringer charge.

Referring now to FIG. 8, after the bladder system 60 has been installed as shown in FIG. 7, a substantially flat composite skin charge 115 is placed on the cure tool 15, overlying the inflatable bladder 55 and in face-to-face contact with the flanges 14 (FIG. 7) of the stringer charge 20 and the flat tool surfaces 80.

Figure 9:
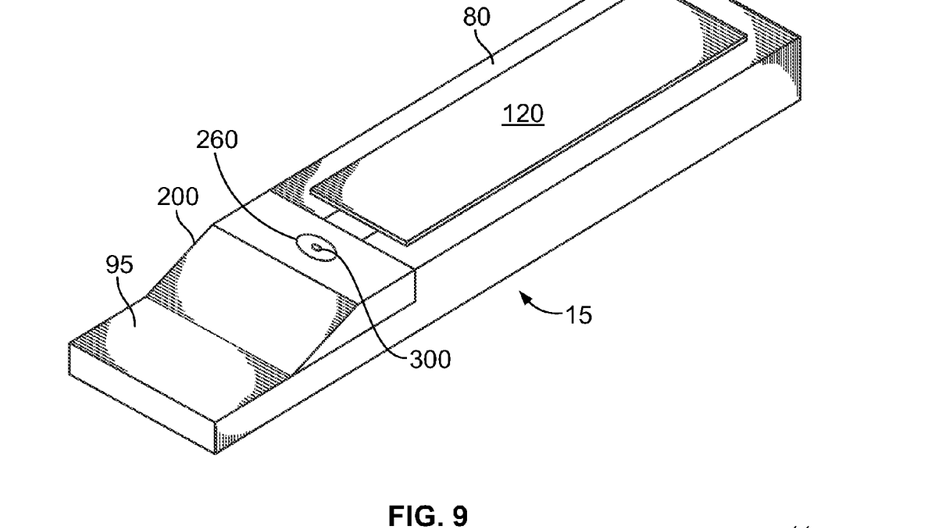
FIG. 9 is an illustration similar to FIG. 8 but showing a caul plate having been installed over the skin charge.
Figure 10:
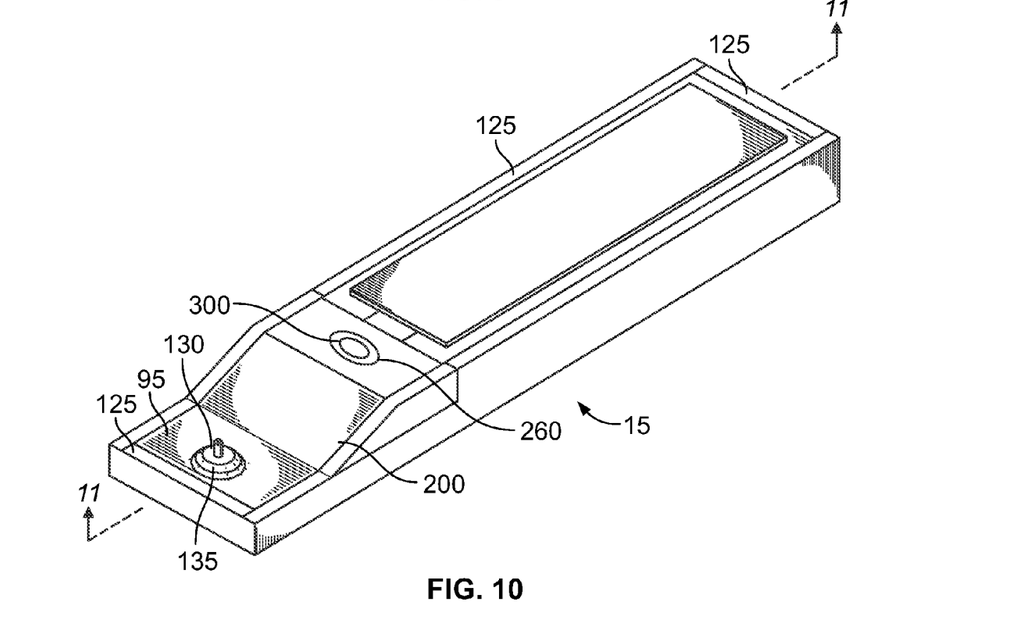
FIG. 10 is an illustration similar to FIG. 9 but showing sealant tape having been applied around a periphery of the cure tool.

Next, as shown in FIG. 9, a caul plate 120 may be installed over the flat composite skin charge 115 in order to apply substantially even pressure over the skin charge 115 during the curing process. Also, although not shown in FIG. 7, peel plies, release films and/or breathers or other components may be installed along with the caul plate 120, depending on the application. Next, and as shown in FIG. 10, a suitable sealant tape 125 or other suitable sealant may be applied to the perimeter of the cure tool 15 in preparation for vacuum bagging the tool 15. At this point, a vacuum probe base 130 may be applied to the flat end section 95 of the cure tool 15, adjacent the installed bladder end fitting 200. Next, a vacuum probe 135 may be mounted on the vacuum probe base 130. This vacuum probe may be adapted to be coupled with a vacuum source 145 (not shown) for evacuating or selectively relieving pressure within a vacuum bag 25 during a cure cycle.

Figure 11:
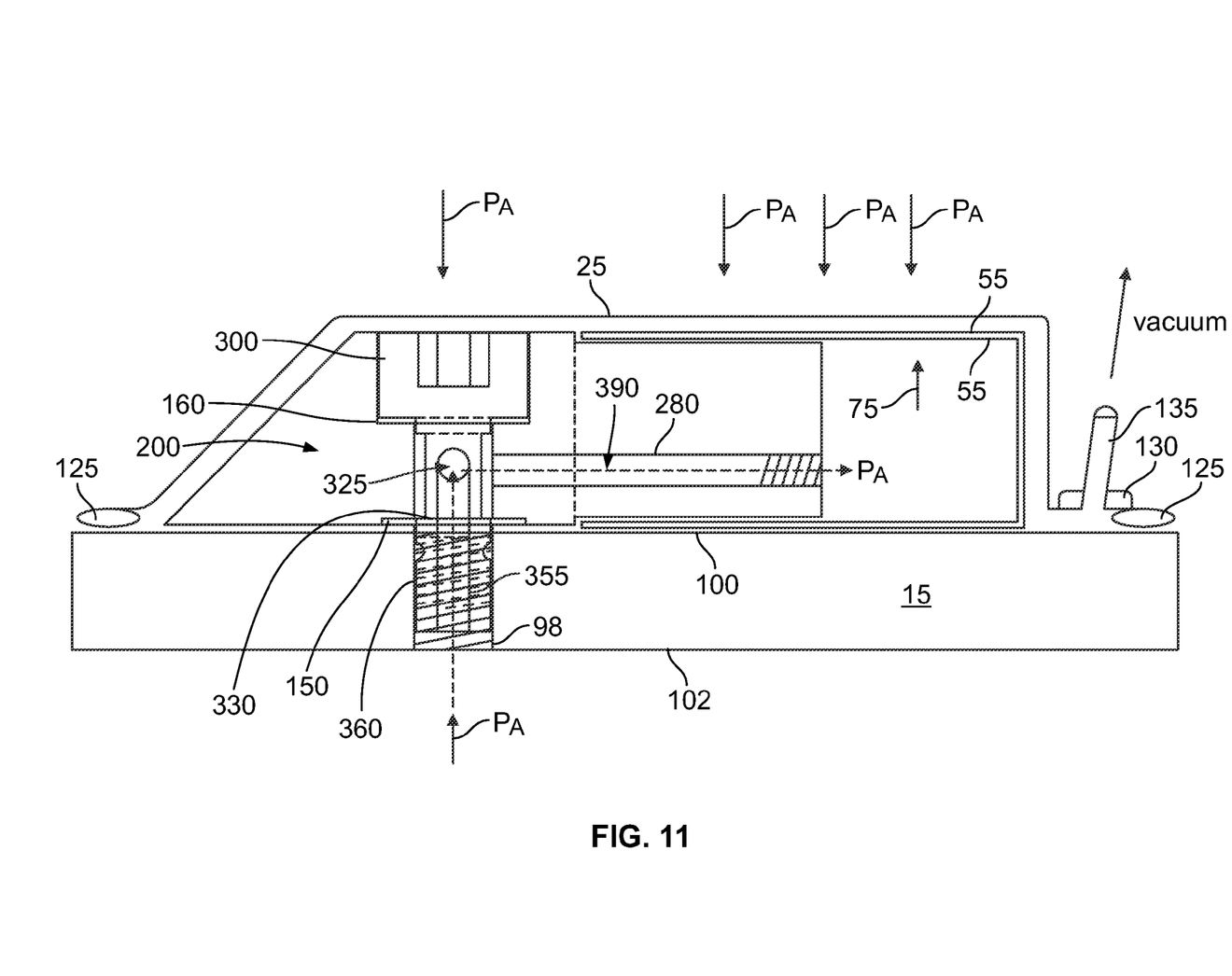
FIG. 11 is an illustration of a sectional view taken along the line 30-30 in FIG. 10, but additionally showing a vacuum bag having been installed over and sealed to the cure tool.

For example, one implementation of a preferred bladder system connection is illustrated in FIG. 11. FIG. 11 illustrates a next process step. Following installation of the first and the second pressure sealing members 150, 160, the vent bolt 300 shown in FIG. 10, a flexible bag 25, sometimes referred to as a vacuum bag 25, formed of a suitable material such as polyester or nylon, is installed over the tool 15, covering the bladder end fitting 200, the venting bolt enlarged head 305, the stringer charge 10, and the bladder 55. The vacuum bag 25 is sealed to the periphery of the cure tool 15 and around the vacuum probe 130 using sealing tape 125 or other suitable sealants.

Evacuation of vacuum bag 25 draws the vacuum bag 25 down towards the bladder end fitting 200, a top portion of the vent bolt 300, the bladder 55, and the top surface of the tool 15. During a curing step carried out within an autoclave, autoclave pressure $P_A$ forces the vacuum bag 25 against the cure tool 15, thereby compacting the composite charge 10. In addition, since autoclave pressure $P_A$ is communicated to the bottom of the vent bolt 300, the autoclave pressure $P_A$ is also applied to an interior of the bladder 55. Specifically, the bottom portion of the tool 15 may be plumbed to receive autoclave pressure and this pressure would be communicated to the interior of the bladder 55 by way of a venting pathway. The pressure sealing members 150, 160 will be compressed between the venting bolt 300 and the end fitting 200 and the end fitting and the flat section 95 of the tool 15 so as to seal and therefore properly contain the external pressure within the pressure passageway 390.

Where the presently discussed bladder system 60 is used on co-curing a large number of stringers at the same time, each separate bladder for each of the stringers may also be plumbed to the same autoclave pressure. In order for this autoclave pressure $P_A$ to reach an interior 75 of the bladder 55, the autoclave pressure $P_A$ would follow a pressure passageway 390. Such a pressure pathway 390 would comprise the internal bore 355 of the vent bolt 300 which is coupled to the horizontal bore 280 of the bladder end fitting 200 by way of the axial port 325 of the vent bolt 300, thereby internally pressurizing the interior of the bladder 55 with autoclave pressure $P_A$. This internal pressurization of the bladder 55 causes a force $P_A$ to be applied to composite charge 10. Therefore, the composite charge being molded can be cured in the autoclave while the bladder 55 maintains its inflated state. This helps to ensure, that during the curing and molding interval, that the outer surface of the composite charge will be forced against respective tool surfaces of the tool 15 and the caul sheet 115. When curing is complete, the autoclave pressure $P_A$ is removed from the vacuum bag 25, and therefore is also removed from the interior 75 of the bladder 55.

Figure 12:
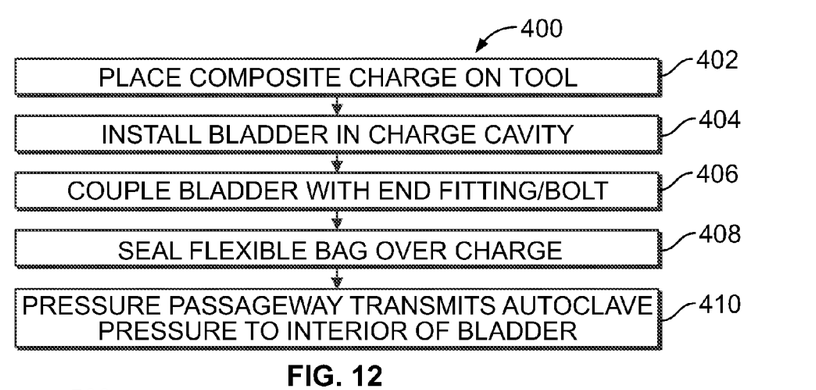
FIG. 12 is an illustration of a flow diagram of a method of autoclave curing a composite part charge having an internal cavity using a bladder system as disclosed herein.

Attention is now directed to FIG. 12 which broadly illustrates the steps of a method 400 for autoclave curing using the bladder system 60 described above. For example, and beginning at Step 402, a composite resin charge 10 is supported within an autoclave by being placed on a suitable tool, such as the cure tool 15 as discussed and illustrated herein. At Step 404, the bladder 55 is installed in the charge cavity. Then, at Step 406, the bladder 55 may be coupled to a bladder end fitting 200, and a venting bolt 300 so as to create a bladder system 60 as previously described. In one preferred arrangement, the bladder end fitting 200 is removably coupled to a generally planar top surface of the cure tool 15 and the flexible, inflatable bladder 55 is installed in an internal cavity 45 of the charge 10. The internal bolt bore 355 of the vent bolt 300 is fluidly coupled to the horizontal bore 280 of the bladder end fitting 200 so as to define a pressure passageway between an autoclave and the bladder 55 so as to allow autoclave pressure $P_A$ into the interior 75 of the bladder 55. At Step 408, the composite charge 20 along with the bladder 55, the bladder end fitting 200, and a top portion of the venting bolt 300 are covered with a flexible bag 25 such as a vacuum bag, which is then sealed to the cure tool 15.

At Step 410, autoclave pressure $P_A$ is applied to the bag 25 in order to compress composite charge. In addition, autoclave pressure $P_A$ is also applied to the interior 75 of the bladder 55 by way of the pressure passageway 390 thereby pressuring the bladder 55 to react forces applied to the composite charge 15 by autoclave pressure.

Figure 13:
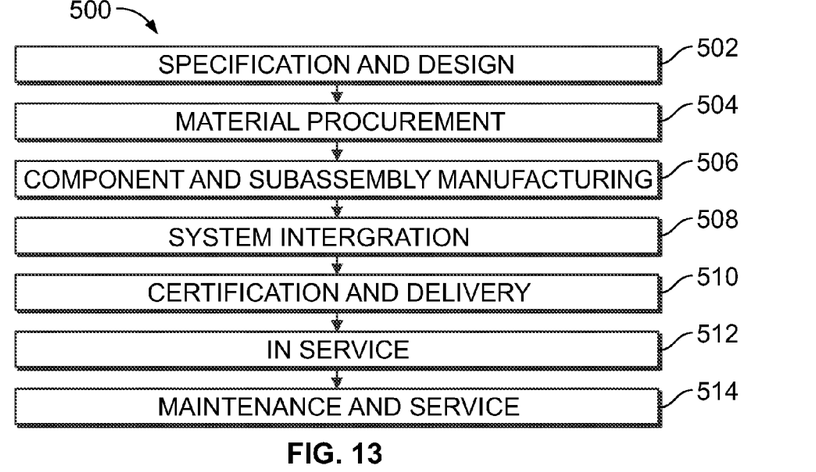
FIG. 13 is an illustration of a flow diagram of aircraft production and service methodology.
Figure 14:
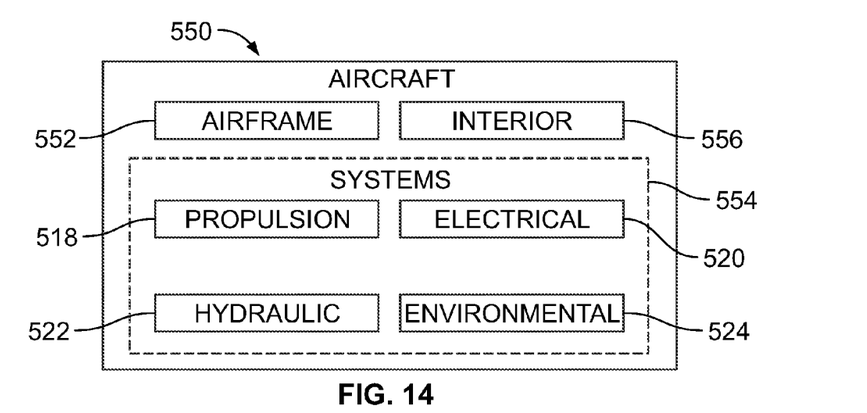
FIG. 14 is an illustration of a block diagram of an aircraft.

Embodiments of the disclosure may find use in a variety of potential applications, particularly in the transportation industry, including for example, aerospace, marine, automotive applications and other application where autoclave curing of composite parts may be used. Therefore, referring now to FIGS. 13 and 14, embodiments of the disclosure may be used in the context of an aircraft manufacturing and service method 500 as shown in FIG. 13 and an aircraft 550 as shown in FIG. 14. Aircraft applications of the disclosed embodiments may include, for example, without limitation, curing of stiffener members such as, without limitation beams, spars and stringers, to name only a few. During pre-production, exemplary method 500 may include specification and design 502 of the aircraft 550 and material procurement 502. During production, component and subassembly manufacturing 506 and system integration 508 of the aircraft 550 takes place. Thereafter, the aircraft 550 may go through certification and delivery 510 in order to be placed in service 512. While in service by a customer, the aircraft 550 is scheduled for routine maintenance and service 514, which may also include modification, reconfiguration, refurbishment, and so on.

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 550 produced by exemplary method 500 may include an airframe 552 with a plurality of systems 554 and an interior 556. Examples of high-level systems 554 include one or more of a propulsion system 518, an electrical system 520, a hydraulic system 522, and an environmental system 524. Any number of other systems may be included. Although an aerospace example is shown, the principles of the disclosure may be applied to other industries, such as the marine and automotive industries.

Systems and methods embodied herein may be employed during any one or more of the stages of the production and service method 500. For example, components or subassemblies corresponding to production process 502 may be fabricated or manufactured in a manner similar to components or subassemblies produced while the aircraft 550 is in service. Also, one or more apparatus embodiments, method embodiments, or a combination thereof may be utilized during the production stages 502 and 504, for example, by substantially expediting assembly of or reducing the cost of an aircraft 550. Similarly, one or more of apparatus embodiments, method embodiments, or a combination thereof may be utilized while the aircraft 500 is in service, for example and without limitation, to maintenance and service 510.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. Apparatus for use in curing of a composite charge having an internal cavity, comprising:
    a flexible bladder adapted to be placed in the cavity for applying pressure on the composite charge during autoclave curing;
    an end fitting operatively coupled to the flexible bladder, the end fitting defining a bolt bore and a horizontal bore;
    wherein when a vent bolt is operatively coupled to the bolt bore of the end fitting, the vent bolt comprising a top portion;
    wherein the vent bolt and the horizontal bore define a pressure passageway that allows an interior of the bladder to become subjected to an external pressure; and
    a flexible bag sealed over the flexible bladder, the end fitting, and the vent bolt;
    wherein the flexible bag completely covers the top portion of the vent bolt.

2. The apparatus of claim 1, further comprising:
a cure tool adapted to have the composite charge placed thereon, and
wherein the flexible bladder is located on the composite charge and the flexible bag is sealed to the cure tool.

3. The apparatus of claim 2 wherein the cure tool comprises a composite cure tool.

4. The apparatus of claim 3 wherein the bolt bore of the end fitting is positioned to align with a tool bore provided along a matching surface of the cure tool.

5. The apparatus of claim 3 wherein the vent bolt is inserted into the bolt bore of the end fitting, and
wherein the vent bolt is torqued into place such that that the vent bolt threadingly connects to a tool bore.

6. The apparatus of claim 4 wherein the vent bolt is inserted into the bolt bore of the end fitting, and
wherein the vent bolt is torqued into place such that that the vent bolt threadingly connects to a threaded insert provided in the tool bore.

7. The apparatus of claim 1, wherein the bolt bore of the end fitting extends from a first surface to a second surface of the end fitting.

8. The apparatus of claim 2, wherein the tool comprises a vacuum port adapted to be coupled with a vacuum source for selectively relieving pressure within the flexible bag.

9. The apparatus of claim 1 wherein the bolt bore of the end fitting comprises
a first bolt bore section and a second bolt bore section
wherein a diameter of the first bolt bore section is different than a diameter of the second bolt bore section.

10. The apparatus of claim 9 wherein the diameter of the first bolt bore section is larger than the diameter of the second bolt bore section.

11. The apparatus of claim 1 wherein
an internal bolt bore of the vent bolt and the horizontal bore of the end fitting define the pressure passageway that allows an interior of the bladder to become subjected to the external pressure.

12. The apparatus of claim 2 further comprising
a first pressure sealing member positioned between the vent bolt and the end fitting,
wherein the first sealing member contains the external pressure within the pressure passageway.

13. The apparatus of claim 12 further comprising
a second pressure sealing member positioned between the end fitting and the tool,
wherein the second sealing member contains the external pressure within the pressure passageway.

\* \* \* \* \*